US010767028B2

(12) United States Patent
Tassinari et al.

(10) Patent No.: US 10,767,028 B2
(45) Date of Patent: Sep. 8, 2020

(54) COMPOUNDED RUBBER HAVING IMPROVED THERMAL TRANSFER

(71) Applicant: Cabot Corporation, Boston, MA (US)

(72) Inventors: Oliver W. Tassinari, Boston, MA (US); Greggory C. Smith, Carlisle, MA (US); Federico Villalpando-Paez, San Francisco, CA (US); Alyson M. Christopher, San Jose, CA (US); Ping Zhang, Westford, MA (US)

(73) Assignee: Cabot Corporation, Boston, MA (US)

( * ) Notice: Subject to any disclaimer, the term of this patent is extended or adjusted under 35 U.S.C. 154(b) by 125 days.

(21) Appl. No.: 16/073,821

(22) PCT Filed: Jan. 19, 2017

(86) PCT No.: PCT/US2017/014130
§ 371 (c)(1),
(2) Date: Jul. 30, 2018

(87) PCT Pub. No.: WO2017/136150
PCT Pub. Date: Aug. 10, 2017

(65) Prior Publication Data
US 2019/0040225 A1    Feb. 7, 2019

Related U.S. Application Data

(60) Provisional application No. 62/289,616, filed on Feb. 1, 2016, provisional application No. 62/306,127, filed on Feb. 10, 2016.

(51) Int. Cl.
| | | |
|---|---|---|
| *C08K 3/04* | (2006.01) | |
| *C08L 61/14* | (2006.01) | |
| *B60C 1/00* | (2006.01) | |
| *C08F 212/08* | (2006.01) | |
| *C08F 236/06* | (2006.01) | |
| *C09K 5/14* | (2006.01) | |
| *B29D 30/06* | (2006.01) | |

(52) U.S. Cl.
CPC ............... *C08K 3/04* (2013.01); *B60C 1/00* (2013.01); *B60C 1/0016* (2013.01); *C08F 212/08* (2013.01); *C08F 236/06* (2013.01); *C08L 61/14* (2013.01); *C09K 5/14* (2013.01); *B29D 30/0654* (2013.01); *B29D 2030/0655* (2013.01); *B29K 2809/06* (2013.01); *C08K 2201/001* (2013.01); *C08K 2201/006* (2013.01); *C08K 2201/014* (2013.01); *C08L 2205/03* (2013.01)

(58) Field of Classification Search
CPC ........................................................ C08K 3/04
See application file for complete search history.

(56) References Cited

U.S. PATENT DOCUMENTS

| | | | |
|---|---|---|---|
| 2,068,447 A | 1/1937 | Cox | |
| 2,149,671 A | 3/1939 | Franck | |
| 3,098,893 A * | 7/1963 | Pringle | ............... H01B 11/00 |
| | | | 174/102 SC |
| 3,379,673 A | 4/1968 | Rossman | |
| 3,408,164 A | 10/1968 | Johnson | |
| 4,061,719 A | 12/1977 | Schallus et al. | |
| 4,097,656 A | 6/1978 | Dany et al. | |
| 4,098,968 A | 7/1978 | Wortmann et al. | |
| 4,160,813 A | 7/1979 | Markel et al. | |
| 4,231,919 A | 11/1980 | Isaacson | |
| 4,273,697 A | 6/1981 | Sumimura et al. | |
| 4,329,329 A | 5/1982 | Dolkemeyer et al. | |
| 4,351,815 A | 9/1982 | Glasstetter et al. | |
| 4,374,113 A | 2/1983 | Yates et al. | |
| 4,391,941 A | 7/1983 | Cotton et al. | |
| 4,459,273 A | 7/1984 | Dolkemeyer et al. | |
| 4,493,788 A | 1/1985 | Fujie et al. | |
| 4,518,434 A | 5/1985 | Wilder | |
| 4,526,952 A | 7/1985 | Zeitler et al. | |
| 4,543,240 A | 9/1985 | Goldberger | |
| 4,601,887 A | 7/1986 | Dorn et al. | |
| 4,624,003 A | 11/1986 | Eirich et al. | |
| 4,693,879 A | 9/1987 | Yoshimura et al. | |
| 4,698,913 A | 10/1987 | Voll | |
| 4,702,860 A | 10/1987 | Kinderov et al. | |
| 4,842,943 A | 6/1989 | Kobayashi et al. | |

(Continued)

FOREIGN PATENT DOCUMENTS

| | | |
|---|---|---|
| CA | 2226277 | 3/2008 |
| CN | 105001464 A | 10/2015 |

(Continued)

OTHER PUBLICATIONS

Ayala, J.A., et al., "Carbon-Black-Eastomer Interaction II: Effects of Carbon Black Surface Activity and Loading", Rubber Chemistry and Technology, vol. 66, pp. 772-805.
Wang, M., "Application of Inverse Gas Chromatography to the Study of Rubber Reinforcement", in *Powders & Fibers: Interfacial Science and Applications*, Nardin and Papirer, eds., Taylor & Francis Group, LLC, 2007, pp. 123-167.
Schaeffer, W.D., et al., "Structure and Properties of Carbon Black", Industrial and Engineering Chemistry, Aug. 1953, pp. 1721-1725.
The International Search Report and The Written Opinion of the Inbternational Searching Authority, or the Declaration of International Patent Application No. PCT/US2017/014830, dated Apr. 20, 2017.

(Continued)

*Primary Examiner* — Wenwen Cai (57) ABSTRACT

A compounded elastomer comprising an elastomeric resin, a first carbon black, and a second carbon black different from the first carbon black. The second carbon black is a partially crystallized carbon black having an OAN structure of greater than 120 cm$^3$/100 g and less than 200 cm$^3$/100 g, a surface energy of less than 10 mJ/m$^2$ and a Raman microcrystalline planar size ($L_a$) of greater than or equal to 25 Å and less than or equal to 50 Å.

25 Claims, 2 Drawing Sheets

(56) References Cited

U.S. PATENT DOCUMENTS

| | | |
|---|---|---|
| 4,927,718 A | 5/1990 | Ross, Jr. |
| 5,317,592 A | 5/1994 | Van Staden |
| 5,579,334 A | 11/1996 | Baxter et al. |
| 5,798,405 A | 8/1998 | Zimmer et al. |
| 6,061,384 A | 5/2000 | Koslow |
| 6,086,792 A | 7/2000 | Reid et al. |
| 6,157,667 A | 12/2000 | Johansen et al. |
| 6,331,586 B1 | 12/2001 | Thielen et al. |
| 6,482,386 B2 | 11/2002 | Atchetee et al. |
| 6,649,300 B2 | 11/2003 | Ito et al. |
| 6,689,505 B1 | 2/2004 | Albers et al. |
| 6,780,388 B2 | 8/2004 | Masuko et al. |
| 6,825,262 B2 | 11/2004 | Görl et al. |
| 7,150,840 B2 | 12/2006 | Yamamoto et al. |
| 7,217,405 B2 | 5/2007 | Karl |
| 7,378,468 B2 | 5/2008 | Lechtenboehmer |
| 7,485,280 B2 | 2/2009 | Matsuki et al. |
| 7,569,161 B2 | 8/2009 | Nagao et al. |
| 7,722,713 B2 | 5/2010 | Green et al. |
| 7,879,261 B2 | 2/2011 | Oriji et al. |
| 8,062,557 B2 | 11/2011 | Takagi et al. |
| 8,308,990 B2 | 11/2012 | Oriji et al. |
| 8,420,044 B2 | 4/2013 | Bergemann et al. |
| 8,480,930 B2 | 7/2013 | Suh et al. |
| 8,895,142 B2 | 11/2014 | Kyrlidis et al. |
| 8,932,482 B2 | 1/2015 | Atanassova et al. |
| 2001/0031823 A1 | 10/2001 | Atchetee et al. |
| 2003/0108481 A1 | 6/2003 | Igarashi et al. |
| 2003/0176562 A1 | 9/2003 | Rafailovich et al. |
| 2004/0013599 A1 | 1/2004 | Bhatt |
| 2004/0110005 A1 | 6/2004 | Choi et al. |
| 2005/0063892 A1 | 3/2005 | Tandon et al. |
| 2005/0063893 A1 | 3/2005 | Ayala et al. |
| 2006/0269772 A1 | 11/2006 | Han et al. |
| 2009/0208751 A1 | 8/2009 | Green et al. |
| 2012/0214000 A1 | 8/2012 | Kyrlidis et al. |
| 2013/0157140 A1 | 6/2013 | Bartling et al. |
| 2013/0214211 A1 | 8/2013 | Lehmann et al. |
| 2013/0295462 A1 | 11/2013 | Atanassova et al. |
| 2014/0120339 A1 | 5/2014 | Nikova et al. |
| 2014/0377659 A1* | 12/2014 | Oljaca ............ H01M 4/0416 429/221 |
| 2015/0034858 A1 | 2/2015 | Raman et al. |
| 2015/0299436 A1 | 10/2015 | Shin et al. |

FOREIGN PATENT DOCUMENTS

| | | |
|---|---|---|
| DE | 3339700 A1 | 6/1984 |
| EP | 0307205 A2 | 3/1989 |
| EP | 1164651 A1 | 12/2001 |
| EP | 1288161 A1 | 3/2003 |
| EP | 1309024 A2 | 5/2003 |
| EP | 1790693 A1 | 5/2007 |
| EP | 2610299 A1 | 7/2013 |
| GB | 1144160 | 3/1969 |
| JP | 57138296 A | 8/1982 |
| JP | 59122555 A | 7/1984 |
| JP | 60009060 A | 1/1985 |
| JP | 61012753 A | 1/1986 |
| JP | S6143659 A | 3/1986 |
| JP | 61066759 A | 4/1986 |
| JP | 61185544 A | 8/1986 |
| JP | 61254645 A | 11/1986 |
| JP | 10060169 A | 3/1998 |
| JP | 11172146 A | 6/1999 |
| TW | I349019 | 9/2011 |
| WO | WO 03/017289 A1 | 2/2003 |
| WO | WO2005/028569 A2 | 3/2005 |
| WO | WO 2005/028569 A2 | 3/2005 |
| WO | WO 2010/068339 A1 | 6/2010 |
| WO | WO 2013/096784 A1 | 6/2013 |
| WO | WO 2014/205210 A1 | 12/2014 |

OTHER PUBLICATIONS

Written Opinion of the International Preliminary Examining Authority of International Patent Application No. PCT/US2017/014830, dated Jan. 26, 2018.

The International Preliminary Report on Patentability of International Patent Application No. PCT/US2017/014830, dated May 7, 2018.

TW Search Report, dated Oct. 6, 2017.

Barsukov, I., et al., "Novel materials for electrochemical power sources—introduction of PUREBLACK Carbons", *J. of Power Sources* 153 (2006), pp. 288-299.

Ungár, T., et al., "Size and shape of crystallites and internal stresses in carbon blacks", *Composites Part A: Applied Sci and Manufacturing* 36 (2005), pp. 431-436.

Fröhlich, J, et al., "The effect of Filler-filler and filler-elastomer interaction on rubber reinforcement", *Composites Part A: Applied Sci and Manufacturing* 36 (2005), pp. 449-460.

\* cited by examiner

COMPOUNDED RUBBER HAVING IMPROVED THERMAL TRANSFER

FIELD OF THE DISCLOSURE

The present disclosure relates to compounded elastomers and, in particular, to flexible elastomers compounded with carbon black for improved thermal conductivity and mechanical properties.

BACKGROUND

Elastomeric polymers are used in a variety of industries including tires and tire manufacturing. Butyl rubbers, for example, are used to make inflatable tire bladders that are used to support the interior surface of a tire while the tire is being cured. These tire bladders are typically re-used multiple times and are repeatedly inflated and deflated at high temperatures.

SUMMARY

In one aspect a compounded elastomer is provided, the compound elastomer comprising an elastomeric resin, a first carbon black, a second carbon black different from the first carbon black, the second carbon black a partially crystallized carbon black having an OAN structure of greater than 120 cm$^3$/100 g and less than 200 cm$^3$/100 g, a surface energy of less than 10 mJ/m$^2$ and a Raman microcrystalline planar size ($L_a$) of greater than or equal to 25 Å and less than or equal to 50 Å. The weight ratio of the first carbon black to the second carbon black can be less than 2:1 and greater than 1:2. The elastomeric resin can be selected from butyl rubber, halobutyl rubber, nitrile, hydrogenated nitrile butadiene rubber (HNBR), ETDM, polychloroprene rubber, acrylonitrile butadiene rubber, hydrogenated nitrile rubber, fluoroelastomers, polyacrylate elastomers, ethylene propylene diene monomer (EPDM), ethylene vinyl acetate elastomers (EVA), polysulfide elastomers, natural rubber and styrene butadiene rubber. The compounded elastomer can have a thermal conductivity of greater than 0.29 W/mK and may exhibit a tensile strength of greater than 14.00 MPa, and elongation at break of greater than 550% and/or an ((elongation at break)×(tensile strength))/100% of greater than 80. The second carbon black may be a carbon black that has been thermally treated at a temperature between 1100° C. and 1800° C. The second carbon black may have a percent crystallinity of greater than 40% and less than 60%. The elastomer can be a butyl elastomer or a halobutyl elastomer. The first carbon black can be a furnace black that meets the requirements of an ASTM N330 type carbon black. A tire bladder may be fabricated from the compounded elastomer.

In another aspect, a compounded butyl elastomer is provided, the compounded butyl elastomer comprising at least two different carbon blacks wherein the butyl elastomer exhibits a thermal transfer efficiency of greater than 0.25 W/mK and an ((elongation at break)×(tensile strength))/100% of greater than 80. When cured, the compounded butyl elastomer can exhibit a thermal transfer efficiency of greater than 0.30 W/mK. One of the carbon blacks can be a partially crystallized carbon black and one of the carbon blacks may be a furnace black or derived from a furnace black. The concentration of the partially crystallized carbon black can be greater than 25 phr and the concentration of the furnace black may be at least 15 phr. The concentration of the partially crystallized carbon black can be greater than the concentration of the furnace black. The partially crystallized carbon black can have a Raman microcrystalline planar size ($L_a$) of greater than or equal to 22 Å. A tire bladder may be made of the compounded butyl elastomer.

In another aspect, a butyl elastomer is provided, the butyl elastomer comprising at least 40 phr carbon black having a Raman microcrystalline planar size ($L_a$) of greater than or equal to 22 Å and less than 45 Å, an OAN structure of greater than 120 and less than 200 cm$^3$/100 g, and wherein the butyl elastomer has a thermal conductivity of greater than 0.29 W/mK and a tensile strength at 25° C. of greater than 14.0.

In another aspect a compounded elastomer is provided, the compounded elastomer comprising an elastomeric resin and a carbon black exhibiting a surface energy of less than 10 mJ/m,$^2$ a Raman microcrystalline planar size ($L_a$) of between 23 Å and 45 Å, and an OAN of greater than 85 cm$^3$/100 g. The OAN of the carbon black can be greater than 130 or greater than 140 or greater than 150 cm$^3$/100 g and less than 300, less than 250 or less than 200 cm$^3$/100 g. The Raman microcrystalline planar size of the carbon black can be greater than 30 Å, greater than 32 Å, greater than 34 Å or greater than 36 Å and less than 50 Å, less than 48 Å, less than 45 Å or less than 43 Å, and the surface energy of the carbon black can be less than 7 mJ/m$^2$, less than 5 mJ/m$^2$, less than 2 mJ/m$^2$ or less than 1 mJ/m$^2$.

In another aspect a compounded butyl elastomer is provided, the compounded butyl elastomer comprising at least 40 phr carbon black, wherein the (thermal conductivity in W/mK)×(elongation at break %)×(tensile strength in MPa) of the elastomer is greater than 2200.

In another aspect, the partially crystallized carbon black can be produced by thermal treatment of a furnace black at a temperature of less than 1800° C. for a period of time adequate to increase the Raman microcrystalline planar size ($L_a$) of the base furnace black by greater than 5, greater than 6, greater than 10, greater than 15 or greater than 20 Å. The Raman microcrystalline planar size ($L_a$) of the base furnace black can be increased by less than 50, less than 40, than 35, less than 30, less than 25 or less than 20 Å.

DETAILED DESCRIPTION

In one aspect a compounded elastomeric material is described that includes one, two, three or more distinct particulate carbon materials such as carbon black. The carbon materials can provide the elastomeric material with improved thermal transfer properties combined with improved mechanical properties. When used in a tire bladder, for example, such an elastomeric composition can provide faster heat exchange, faster manufacturing cycle times and an increased bladder lifetime (i.e., the bladder is capable of a greater number of manufacturing cycles before requiring replacement). In some embodiments, the compounded elastomer may include two carbon blacks such as a furnace black and a partially crystallized carbon black. The compounded elastomer can include any elastomer that benefits from strong mechanical characteristics as well as good thermal or electrical conductivity.

Elastomers used herein may be natural or synthetic and can include, for example, homopolymers, copolymers, terpolymers or mixtures thereof. The elastomers include thermoset polymers that vulcanize during curing and can also include thermoplastics. The elastomer may have a glass transition temperature (Tg) as measured by differential scanning calorimetry ranging from about −120° C. to about 20° C. The elastomer may be a rubber or "diene" elastomer. The term "diene" elastomer or rubber should be understood as meaning, in a known way, an elastomer (one or more are understood) resulting at least in part (i.e., a homopolymer or a copolymer) from diene monomers (monomers carrying two carbon-carbon double bonds which may or may not be conjugated).

Diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %). Thus, diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Synthetic diene elastomers may be selected from highly unsaturated diene elastomers consisting of polybutadienes (abbreviated to "BR"), synthetic polyisoprenes (IR), butadiene copolymers, isoprene copolymers and the mixtures of these elastomers. Specific copolymers include butadiene/styrene copolymers (SBR), isobutylene-isoprene rubber (IIR), isoprene/butadiene copolymers (BIR), isoprene/styrene copolymers (SIR) and isoprene/butadiene/styrene copolymers (SBIR). In particular embodiments, the copolymer, such as IIR, can exhibit a Mooney Viscosity (ASTM D1646) of from 46 to 56 MU, a maximum volatiles content of 0.3% by weight and an unsaturation of between 1.50 and 1.90 molar percent.

The elastomers used in the disclosed composites can, for example, be block, random, sequential or microsequential elastomers and can be prepared in dispersion or in solution; the elastomers can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or of polyether groups (such as described, for example, in U.S. Pat. No. 6,503,973). Each of these references is hereby incorporated by reference herein. Other examples of such functionalized elastomers epoxidized elastomers of the SBR, BR, NR or IR type.

Exemplary elastomers include: polybutadienes, in particular those having a content of 1,2-units from 4% to 80% or those having a content of cis-1,4-units of greater than 80%; polyisoprenes; butadiene/styrene copolymers, in particular those having a styrene content from 5% to 70% by weight, more particularly from 10% to 50%, for example, from 20% to 40% by weight or from about 23% to about 28% by weight, a content of 1,2-bonds of the butadiene part from 4% to 65% and a content of trans-1,4-bonds from 20% to 80%; butadiene/isoprene copolymers, in particular those having an isoprene content from 5% to 90% by weight and a Tg (measured according to ASTM D 3418-82) of −40° C. to −80° C.; or isoprene/styrene copolymers, in particular those having a styrene content from 5% to 50% by weight and a Tg from −25° C. to −50° C.

In the case of butadiene/styrene/isoprene copolymers, those having a styrene content of from 5% to 50% by weight and more particularly from 10% to 40%, an isoprene content from 15% to 60% by weight and more particularly from 20% to 50%, a butadiene content from 5% to 50% by weight and more particularly from 20% to 40%, a content of 1,2-units of the butadiene part from 4% to 85%, a content of trans-1,4-units of the butadiene part from 6% to 80%, a content of 1,2-plus 3,4-units of the isoprene part from 5% to 70% and a content of trans-1,4-units of the isoprene part from 10% to 50%, and more generally any butadiene/styrene/isoprene copolymer having a Tg from −20° C. to −70° C., are suitable in particular.

The elastomer may also include natural rubber. The natural rubber may be chemically modified in some manner, or a rubber latex may be so processed before coagulation to form solid natural rubber. For example, the rubber may be treated to chemically or enzymatically modify or reduce various non-rubber components, or the rubber molecules themselves may be modified with various monomers or other chemical groups such as chlorine. Epoxidized natural rubber may also be used.

Exemplary synthetic elastomers include, but are not limited to, rubbers and polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, and propylene. Examples include styrene-butadiene rubber (SBR), styrene-butadiene-styrene block copolymer (SBS), styrene-isoprene-styrene block copolymer (SBS), polybutadiene, polyisoprene, poly(styrene-co-butadiene), polymers and copolymers of conjugated dienes such as polybutadiene, polyisoprene, polyisobutene, polychloroprene, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, polyglycol ether, alphamethylene carboxylic acids and the esters and amides thereof such as acrylic acid and dialkylacrylic acid amide. Also suitable in some embodiments are copolymers of ethylene and other high alpha olefins such as propylene, butene-1 and pentene-1, and copolymers of propylene oxide and allyl glycidyl ether (GPO). Suitable thermoplastic elastomers (TPE) also include thermoplastic polyolefins such as polyethylene, cross-linkable polyethylene, polypropylene and thermoplastic polyurethanes.

In specific embodiments, a variety of butyl rubbers can be used. These include halobutyl rubbers such as chlorinated butyl rubber (chlorobutyl rubber), brominated butyl rubber (bromobutyl rubber). Other suitable elastomers may include chloropolyethylene, epichlorohydrin homopolymer rubber, chlorosulfonylpolyethylene, nitrile rubber, hydrogenated nitrile butadiene rubber (HNBR), polychloroprene rubber, acrylonitrile butadiene rubber, hydrogenated acrylonitrile butadiene rubber acrylonitrile chloroprene rubber, acrylonitrile-isoprene rubber, hydrogenated nitrile rubber, fluoroelastomers such as polychlorotrifluoroethylene, polyacrylate elastomers, ethylene-ethylacrylate copolymer, copolymer of ethylene oxide and chloromethyloxiran, ethylene propylene diene monomer (EPDM), ethylene vinyl acetate elastomers, polysulfide elastomers, natural rubber latex, ethyl acrylate and monomer to facilitate vulcanization (ACM), liquid silicone rubber, methyl silicone rubber, methyl silicone rubber with phenyl groups, methyl silicone rubber with vinyl groups, methyl silicone rubber with phenyl and vinyl groups, methyl silicone rubber with fluoro groups (FMQ), polyurethanes based on polyester (AU), polyurethanes based on polyether (EU), rubber having fluoro and/or fluoro alkyl and/or fluoroalkoxy substituents on the polymer chain (FPM), polynorbornene. Terpolymers may include ethylene-propylene-diene terpolymer, epichlorohydrin-ethyleneoxide terpolymer. Blends and/or oil extended derivatives of any of the elastomers discussed herein may also be used.

A variety of additives other than carbon black can be used in the composites disclosed herein. Additives may be, for instance, particulate materials, liquids, gases and dispersions. Numerous additives are known to those skilled in the art and include, for example, antioxidants, antiozonants, plasticizers, processing aids (e.g., liquid polymers, oils and the like), resins, flame-retardants, extender oils, lubricants, and any mixture thereof. Exemplary additives include but are not limited to zinc oxide and stearic acid. The general use and selection of such additives is well known to those skilled in the art.

Specific industries that may benefit from the compounded elastomers described herein include, for example, automotive, industrial, tires and extruded materials. Specific applications include, for example: hoses, such as those used for coolant, refrigerants, brakes, air conditioning, fuel, oil, chemicals, air and hydraulic fluid; molded goods such as bushings, vibration damping, engine mounts, rail buffers, seals, o-rings, gaskets and bellows; tire components such as tire tread, tire subtread, tire undertread, tire sidewalls and tire beads; and extruded materials such as belts and inner tubes.

In addition, the compounded elastomers disclosed herein can be used in the manufacture of various articles in sealing, insulation, vibration damping, and fluid delivery applications. Exemplary articles include o-ring seals and sealants, gaskets, diaphragms, valves, hydraulic seals, swell packers, blow out preventers, oil resistant hose liners. Other examples of articles include those used under the hoods of automobiles where the engine, engine accessories, and other components may operate at high temperatures, and high thermal conductivity is desirable to dissipate heat effectively or to allow components and articles to operate at lower temperatures. Such articles include wire harnesses, battery cables, turbo hoses, molded air ducts, brake parts, grommets, hydraulic and radiator hoses, transmission seals and gaskets, engine and chassis vibration mounts, constant velocity joint boots, engine seals, and fuel system components. These and other articles can have applications in the oil/gas, aerospace, and automotive industries. The articles disclosed herein can have beneficial properties to enhance one or more of high sealing efficiency at service temperature, high rapid gas decompression (RGD) resistance, and high extrusion resistance.

Figure 1:
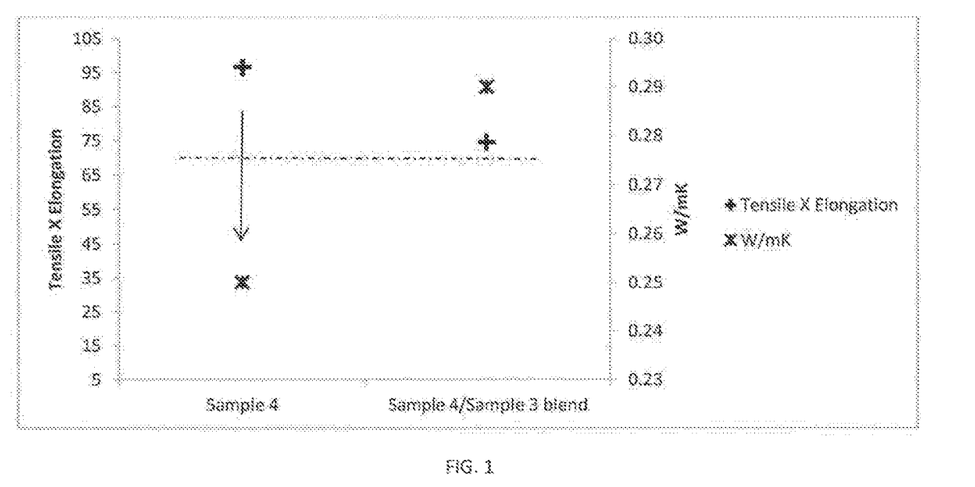
FIG. 1 is a graph illustrating the relationship between tensile strength and thermal transfer efficiency for two embodiments of elastomeric composites.

Tire bladders are used to manufacture vehicle tires and are typically made of butyl rubber such as EXXON™ Butyl 268 rubber (ExxonMobil) or halobutyl rubber. During the tire curing process, the tire bladder is inflated with hot gas or water and is pressurized against the inner surface of the green tire. Heat is exchanged through the expanded elastomeric bladder to aid in curing the tire. As the polymer itself is a poor heat conductor, additives are frequently used to improve the heat transfer from one side of the elastomer to the other. The high temperature employed, in combination with the frequent expansion and contraction of the bladder, means that the bladder must also maintain its mechanical properties such as tear strength and elongation strength under both thermal and mechanical cycling. Acetylene blacks are good conductors of heat and are often added to butyl rubber to improve heat transfer characteristics. Acetylene blacks are a type of carbon black well known to those of skill in the art and are formed by the decomposition (not burning) of acetylene. They are characterized by high structures, a high degree of crystallinity and a low degree of surface energy as compared to other types of carbon black. To improve mechanical characteristics, reinforcing carbon blacks, such as an ASTM N330 type furnace black, are often mixed into the elastomeric material along with the acetylene black. Furnace blacks are a type of carbon black well known to those of skill in the art and are formed by the partial combustion of hydrocarbons in a closed furnace. They can exhibit a wide range of properties such as particle size and aggregate structure. An ASTM N330 type furnace has an iodine absorption number (ASTM D1510) of about 82 g/kg, an oil absorption number (OAN by ASTM D2414) of about 102 mL/100 g; an OAN after crushing (ASTM D3493) of about 88 mL/100 g; a tinting strength (ASTM D3265) of about 104%; and an STSA surface area (ASTM D6556) of about 76 $m^2$/g. ASTM N330 type carbon black does not conduct heat as well as acetylene black does but it typically provides the elastomer with better mechanical properties such as tear strength, tensile strength and elongation. A tire bladder that incorporated only acetylene black would have weaker reinforcing properties than one using only reinforcing carbon blacks (such as an ASTM 200 or 300 series type carbon black) and would be more susceptible to mechanical failure such as abrasion, tearing and cracking. This would result in fewer curing cycles during its lifetime compared to a bladder that includes a reinforcing carbon black. FIG. 1 illustrates the improvement in thermal transfer efficiency that can be obtained by using an acetylene black in combination with a reinforcing ASTM N330 furnace carbon black (Sample 4/Sample 3 blend). Note that a loss in tensile strength in the elastomer accompanies the improvement in thermal transfer efficiency. The tradeoff between thermal transfer efficiency and mechanical strength is believed to be due to the positive relationship between surface energy and mechanical strength in tension with the negative relationship between surface energy and thermal transfer efficiency. Thus, low surface energy carbon blacks provide high thermal transfer but poor mechanical strength and high surface energy carbon blacks provide poor thermal transfer but good mechanical properties. As described herein, it has been found that by using carbon blacks having limited crystallinity (or surface energy) and specific morphology, an elastomeric composite including these carbon blacks can offer a combination of heat transfer efficiency and mechanical strength that exceeds that of currently used materials. This allows the elastomer to provide faster cycle times, greater cycles until failure, or a combination of both.

Partially crystallized carbon blacks can be formed by increasing the crystallinity of a base carbon black (e.g., made by a furnace, thermal, lamp, plasma or acetylene decomposition process) without fully crystallizing the particles. Base furnace blacks exhibit a native crystallinity having a typical Raman microcrystalline planar size ($L_a$) in the range of 16 to 21 Å. In one set of embodiments, base carbon blacks are partially crystallized by controlled heat treatment of a base carbon black. A carbon black is "heat treated or processed" or "thermally treated or processed" if it is exposed to a secondary (after initial particle production) thermal process that alters the crystallinity and surface morphology of the carbon black particle. Crystallization of the carbon black particles can also alter the shape of the particle, changing it from substantially spherical to a polyhedral shape. A heat treated carbon black can be prepared in a tube furnace or other suitable heater by those of skill in the art.

In one method of production, a heat treated carbon black can be prepared in a tube furnace or other suitable heater. The furnace can be heated electrically or by fossil fuel combustion. The temperature of the carbon black bed can be consistent throughout to assure that all of the carbon black is exposed to the same reaction conditions. The carbon black bed may be static or may be a fluidized bed. The samples can be exposed to specific temperatures, for example as provided below, for an amount of time sufficient to reach, but not exceed, the desired partial crystallinity. The samples can be thermally treated in an inert environment and an inert gas such as nitrogen may be passed through or over the carbon black to aid in removal of any volatiles that are lost from the carbon black. By sampling at various time intervals, an operator can analyze the samples and accurately determine the carbon black's level of crystallinity. Those of skill in the art are able to sample the carbon black after such a treatment, analyze the Raman microcrystallinity, and adjust the process accordingly to achieve a target level of, for example, crystallinity or surface energy. Once time and temperature profiles are determined for a specific base carbon black, the profile can be repeated on that specific base carbon black to reproduce partially crystallized carbon blacks having, for instance, desired crystallinity, surface energy, surface area and OAN structure. Other methods and apparatus for heat treating carbon black are known to those of skill in the art and may be calibrated in the same manner.

In various embodiments, carbon black particles may be exposed to temperatures of greater than or equal to 600° C., greater than or equal to 800° C., greater than or equal to 1000° C., greater than or equal to 1100° C., greater than or equal to 1200° C., greater than or equal to 1300° C., greater than or equal to 1400° C., greater than or equal to 1500° C. or greater than or equal to 1600° C. In other embodiments, carbon black particles may be exposed to temperatures of less than 600° C., less than 800° C., less than 1000° C., less than 1100° C., less than 1200° C., less than 1300° C., less than 1400° C., less than 1500° C., less than 1600° C. or less than 1700° C. Specific temperature ranges for treatment include 1000° C. to 1800° C., 1100° C. to 1700° C., 1100° C. to 1600° C., 1100° C. to 1500° C., 1100° C. to 1400° C. and 1100° C. to 1300° C. The treatment can occur in an inert atmosphere such as nitrogen. The dwell time of the material at the selected temperature may be greater than or equal to 30 minutes, one hour, two hours or more than two hours. In some embodiments, the dwell time may be limited to less than three hours, less than two hours, less than 90 minutes, less than one hour or less than 30 minutes. The temperature may be kept constant or in alternative embodiments may be ramped up or down during the dwell time. Partial crystallization may include increasing the native Raman microcrystalline planar size of the base carbon black by greater than or equal to 2, 4, 6, 8, 10, 12, 14, 16, 18, 20, 22 or 24 Å, and/or increasing the native Raman microcrystalline planar size by less than or equal to 35, 30, 25, 20, 15 or 10 Å. Similarly, the native Raman microcrystalline planar size of the base carbon black can be increased by greater than or equal to 10%, 20%, 30%, 50%, 75%, 100%, 120% or 150%. In some embodiments the increase in the Raman microcrystalline planar size of the base carbon black can be limited to less than or equal to 10%, 20%, 30%, 50%, 75%, 100%, 120% or 150%. The amount of crystallization can be checked by pulling carbon black samples at various time intervals and measuring the Raman microcrystalline planar size. Although carbon blacks can vary greatly, carbon blacks are typically considered to be fully crystallized (no longer partially crystallized) after extended exposure to temperatures of greater than 1800° C.

In some of the embodiments described herein, a reinforcing black, e.g., ASTM N330 type carbon black, can be mixed with a second carbon black that replaces or supplements an acetylene black in an elastomeric composite. The second carbon black can be, for example, a partially crystallized furnace black. It can have lower surface energy than the reinforcing carbon black and can exhibit greater thermal transfer efficiency than the reinforcing carbon black. The ratio by weight of the reinforcing carbon black (e.g. an ASTM N330 type carbon black) to the second carbon black may be, for example, greater than 1:5, greater than or equal to 1:4, greater than or equal to 1:3, greater than or equal to 1:2, greater than or equal to 2:3, greater than or equal to 1:1, greater than or equal to 4:3 or greater than or equal to 2:1. In the same or different embodiments, the ratio by weight of reinforcing carbon black to the second carbon black may be, for example, less than 1:5, less than 1:4, less than 1:3, less than 1:2, less than 2:3, less than 1:1, less than 4:3 or less than 2:1. For instance, in one embodiment, the ratio, by weight, of reinforcing carbon black to the second carbon black can be greater than 1:2 and less than 1:1. The total amount of carbon black in the polymeric elastomer can vary depending on its intended use. For instance, in the case of tire bladders, the total amount of carbon black in the compounded elastomer can be based on a weight "per hundred rubber" (phr) basis. The term "phr" is the amount of a substance added to a mixture, on a weight basis, compared to the amount of rubber in the compounded material. The amount of rubber in the compounded material is normalized to "100" and the concentrations of other substances in the compounded material are reported on the same scale. Thus, a compounded elastomer made of equal weights of carbon black and elastomer would have 100 phr carbon black. An elastomer made of 80% elastomer and 20% carbon black by weight would contain 25 phr carbon black. Note that adding additional substances to the compounded material will not change the phr of the carbon black, although it will change the percent by weight of the carbon black in the compounded material. Different embodiments of the compounded elastomers described herein can have total carbon black content of greater than or equal to 20, 30, 40, 45, 50, 60 or 65 phr. Similarly, these and other embodiments may contain total carbon black of less than 70, 60, 50, 40, 30 or 20 phr. Carbon black may comprise, for instance, greater than 20, greater than 50, greater than 75 or greater than 90% of the total particulate material in the elastomer, by weight. Compounded elastomers may contain materials in addition to elastomer and carbon black. These additional materials can include, for example, antioxidants, curatives, cure initiators, resins and solvents, and can be present at concentrations of, for example, greater than 1, 5, 10, 15 or 20 phr. In some embodiments, the only particulate additive is carbon black. However other embodiments may include additional particulate material such as glass fibers, polymer fibers, flakes, clay, glass, and metal oxides including alumina and silica.

Carbon blacks that can be used as the first carbon black, or as third or fourth carbon blacks, include any of the carbon blacks known to those of skill in the art that are employed with elastomeric systems. Exemplary carbon blacks that may be used as the first carbon black include any of those in series ASTM N100 through ASTM N900 series carbon blacks. Specific series that can be used include N100 series carbon blacks, N200 series carbon blacks, N300 series carbon blacks, N500 series carbon blacks, N600 series carbon blacks, N700 series carbon blacks, N800 series carbon blacks, N900 series carbon blacks or combinations thereof. Carbon blacks sold under the Regal®, Black Pearls®, Spheron®, Sterling®, and Vulcan® trademarks available from Cabot Corporation, the Raven®, XT Technology, Ultra®, and other carbon blacks available from Birla Carbon, and the Corax®, Durex®, Ecorax®, Sable™ and Purex® trademarks and the CK line available from Orion Engineered Carbons S.A., and other fillers suitable for use in rubber or tire applications may also be exploited for use with various embodiments.

In one set of embodiments, the crystallinity of a base carbon black is altered via thermal treatment. One measure of crystallinity is the Raman microcrystalline planar size. Raman measurements of $L_a$ (microcrystalline planar size) are based on Gruber et al., "Raman Studies of Heat-Treated Carbon Blacks," Carbon Vol. 32 (7), pp. 1377 1382, 1994, which is incorporated herein by reference. Crystallinity can also be measured by X-ray diffraction (XRD). A partially crystallized carbon black may have a Raman microcrystalline planar size ($L_a$) of at least 20 Å, at least 23 Å, at least 24 Å, at least 25 Å, at least 30 Å, at least 35 Å or at least 40 Å. In some cases, the partially crystallized carbon black has a Raman microcrystalline planar size ($L_a$) of 100 Å or less, 75 Å or less, 50 Å or less, 40 Å or less, 35 Å or less or 30 Å or less. Crystallinity, measured by Raman spectroscopy, may also be reported using the percent crystallinity of the particle and in some cases, the percent crystallinity may be greater than 25, greater than 30, greater than 35, greater than 37, greater than 40, greater than 42 or greater than 50. The same, or different examples, may exhibit a percent crystallinity of less than 80, less than 60, less than 50, less than 45, less than 42, less than 40, less than 38, less than 35, less than 32 or less than 27.

The surface energy (SE) of a carbon black particle can be determined by measuring the water vapor adsorption using a gravimetric instrument. The carbon black sample is loaded onto a microbalance in a humidity chamber and allowed to equilibrate at a series of step changes in relative humidity. The change in mass is recorded. The equilibrium mass increase as a function of relative humidity is used to generate the vapor sorption isotherm. Spreading pressure (in mJ/m$^2$) for a sample is calculated as $\pi_e$/BET, in which:

$$\pi_e = RT\int_0^{p^0} \Gamma d \ln p$$

and R is the ideal gas constant, T is temperature, $\Gamma$ is moles of water adsorbed, p0 is the vapor pressure, and p is the partial pressure of the vapor at each incremental step. The spreading pressure is related to the surface energy of the solid and is indicative of the hydrophobic/hydrophilic properties of the solid, with a lower surface energy (SE) corresponding to a higher hydrophobicity.

In some embodiments, the partially crystallized carbon black has a surface energy (SE) of 10 mJ/m$^2$ or less, 9 mJ/m$^2$ or less, 8 mJ/m$^2$ or less, 7 mJ/m$^2$ or less, 6 mJ/m$^2$ or less, 5 mJ/m$^2$ or less, or 3 mJ/m$^2$ or less. In the same and other embodiments, the partially crystallized carbon black has a surface energy (SE) of greater than 3 mJ/m$^2$, greater than 4 mJ/m$^2$, greater than 5 mJ/m$^2$, greater than 6 mJ/m$^2$, greater than 7 mJ/m$^2$, greater than 8 mJ/m$^2$ or greater than 9 mJ/m$^2$.

One way of measuring the surface area of carbon blacks is the Brunauer-Emmett-Teller method (BET by ASTM 6556). Different embodiments of the partially crystallized carbon blacks used herein may have a BET surface area of at least 100 m$^2$/g, e.g., ranging from 100 m$^2$/g to 600 m$^2$/g. In other cases, the partially crystallized carbon black has a BET of at least 200 m$^2$/g, at least 300 m$^2$/g, at least 400 m$^2$/g, at least 500 m$^2$/g or at least 600 m$^2$/g. In some embodiments, the BET of the partially crystallized carbon black is less than 1200 m$^2$/g, less than 1000 m$^2$/g, less than 800 m$^2$/g, less than 700 m$^2$/g, less than 600 m$^2$/g or less than 500 m$^2$/g.

Another way of characterizing the surface areas of carbon blacks is to use the statistical thickness surface area (STSA). The STSA of many of the carbon blacks described herein can be at least 100 m$^2$/g, e.g., ranging from 100 m$^2$/g to 600 m$^2$/g. In other cases, the partially crystallized carbon black has an STSA of at least 200 m$^2$/g, at least 300 m$^2$/g, at least 400 m$^2$/g, at least 500 m$^2$/g or at least 600 m$^2$/g. In some embodiments, the STSA of the partially crystallized carbon black is less than 1200 m$^2$/g, less than 1000 m$^2$/g, less than 800 m$^2$/g, less than 700 m$^2$/g, less than 600 m$^2$/g or less than 500 m$^2$/g.

While thermal treatment is one method to provide for partial crystallization, specific temperatures, dwell times and furnace geometries may need to be adjusted to arrive at desired levels of crystallinity, structure, surface area and surface energy. For example, it has been found that a partially crystallized carbon black prepared by heating a base carbon black at a temperature ranging from 1100° C. to 1800° C. could yield a thermally-treated carbon black having BET surface area (ASTM 6556) ranging from 100 m$^2$/g to 1100 m$^2$/g and one or more other specific properties, such as a surface energy (SE) of 10 mJ/m$^2$ or less (e.g., 9 mJ/m$^2$ or less, 6 mJ/m$^2$ or less, or 3 mJ/m$^2$ or less), a Raman microcrystalline planar size ($L_a$) of at least 22 Å and less than 60 Å (e.g., ranging from 22 Å to 60 Å, at least 25 Å, or ranging from 25 Å to 50 Å etc.) or a combination thereof.

In many embodiments, the structure of the partially crystallized carbon blacks may be controlled within a specific range. Structure can be measured using the oil absorption number (OAN) which is known to those of skill in the art and is described in ASTM D2414. For example, the OAN may be greater than 80, greater than 100, greater than 120 or greater than 140 cm$^3$/100 g. In other embodiments, the OAN may be less than 220, less than 200, less than 180 or less than 160 cm$^3$/100 g. In certain embodiments, the OAN may be in the range of 80 to 180 cm$^3$/100 g, 80 to 160 cm$^3$/100 g, 100 to 200 cm$^3$/100 g, 100 to 180 cm$^3$/100 g, or 120 to 180 cm$^3$/100 g. In other embodiments, OAN ranges can include 100 to 180 cm$^3$/100 g, 110 to 180 cm$^3$/100 g, 120 to 180 cm$^3$/100 g, 130 to 180 cm$^3$/100 g and 130 to 175 cm$^3$/100 g.

In one embodiment, the carbon black prior to partial crystallization (base carbon black) has a surface energy of greater than 10 mJ/m$^2$ and a BET surface area (ASTM 6556)

of at least 50 m²/g. For example, the BET surface area can be at least 100 m²/g, 200 m²/g, 300 m²/g, at least 500 m²/g, at least 1000 m²/g, 1200 m²/g, at least 1300 m²/g, at least 1400 m²/g, or at least 1500 m²/g. In the same or different embodiments, the BET surface area can be less than or equal to 150 m²/g, 300 m²/g, 500 m²/g, 1000 m²/g, 1500 m²/g or 2100 m²/g. The base carbon black can, in some cases, have a surface energy of greater than 10 mJ/m² and a BET surface area ranging from 200 m²/g to 2100 m²/g, e.g., a BET surface area ranging from 300 m²/g to 2100 m²/g, from 500 m²/g to 2100 m²/g, from 1000 m²/g to 2100 m²/g, from 1200 m²/g to 2100 m²/g, from 1300 m²/g to 2100 m²/g, from 1400 m²/g to 2100 m²/g, or from 1500 m²/g to 2100 m²/g. These same ranges of BET surface areas can be maintained in partially crystallized carbon blacks made from these base carbon blacks although the surface energy will typically be lower than in the base carbon black. The base carbon black can be a furnace black.

provided below in Table 2. As shown, the partially crystallized experimental samples exhibited Raman microcrystalline planar sizes of from 35 to 95 Å. Compared to the native values of their respective base carbon blacks, the experimental samples had an increase in the Raman microcrystalline planar size of from 22.2 to 45 Å, depending on the specific carbon black. The column labeled "$\Delta L_a$ (Angstroms)" shows the change in Raman microcrysallinity planar size from the base carbon black to the partially crystallized carbon black. These samples also had surface energies (SEP) of less than or equal to 8 mJ/m², with most of the experimental samples exhibiting surface energies of less than or equal to 1.4 mJ/m². Note that upon similar thermal treatment, the crystallinity of the ASTM N330 type carbon black (sample 9) increased by only 5.2 Å. The BET surface area of the partially crystallized experimental carbon blacks had values of from 51 to 170 m²/g and OAN values of from 130 to 174 cm³/100 g.

TABLE 2

| Sample | BET (m²/g) | OAN (cm³/100 g) | $L_a$ (Angstroms) | $\Delta L_a$ (Angstroms) | % Crystallinity | SEP (mJ/m²) |
|---|---|---|---|---|---|---|
| 1 | 235 | 174 | 25.5 | Base CB | 36.5 | 19 |
| 2 | 54 | 147 | 21 | Base CB | 33 | 17 |
| 3 | 66 | 218 | 33 | Base CB | 39 | 1.8 |
| 4 | 77.8 | 102 | 17 | Base CB | 28 | 17.4 |
| 5 | 146 | 170 | 36.1 | 10.6 | 40 | 7 |
| 6 | 110 | 161 | 42.6 | 17.1 | 49.5 | 1.4 |
| 7 | 51 | 135 | 35 | 14 | 45 | <1 |
| 8 | 51 | 130 | 45 | 24 | 50 | <1 |
| 9 | 82.7 | 83 | 22.2 | 5.2 | 33.7 | 7.8 |

Example 1

In a first example, base carbon black samples of an ASTM N330 type carbon black (VULCAN® 3 carbon black available from Cabot Corporation), VULCAN® XC72 carbon black (Cabot) and VULCAN® XC500 carbon black (Cabot) were thermally treated under an inert atmosphere at the temperatures indicated in Table 1 until they achieved the values of Raman $L_a$ indicated in Table 2. The resulting partially crystallized carbon blacks were evaluated for thermal and mechanical properties. A treatment temperature of "untreated" indicates that these carbon blacks were not subjected to thermal treatment. Denka Black carbon black (Denka) is an acetylene black that is used in tire bladder manufacture.

TABLE 1

| Sample ID | Base Carbon Black | Treatment Temperature ° C. |
|---|---|---|
| 1 | VULCAN XC72 | Untreated |
| 2 | VULCAN XC500 | Untreated |
| 3 | DENKA BLACK | Untreated |
| 4 | VULCAN 3 | Untreated |
| 5 | VULCAN XC72 | 1200 |
| 6 | VULCAN XC72 | 1500 |
| 7 | VULCAN XC500 | 1200 |
| 8 | VULCAN XC500 | 1500 |
| 9 | VULCAN 3 | 1200 |

The partially crystallized thermally treated carbon blacks from Table 1 were analyzed to measure BET surface area (ASTM 6556), OAN structure (ASTM 2414), Raman planar size, percent crystallinity (by Raman spectroscopy) and surface energy (as described herein). These values are Example 2

To evaluate the thermal and mechanical properties of these partially crystallized carbon blacks in elastomeric compositions, composite rubber samples were produced using some of the partially crystallized carbon blacks of Table 1. Samples were produced by compounding 100 parts by weight Exxon Butyl 268 polymer, 5 parts by weight paraffinic process oil, 5 parts by weight zinc oxide, 10 parts by weight brominated phenol formaldehyde resin and 50 parts by weight (phr) carbon black. The components were thoroughly mixed in a 1600 cc Banbury mixer (70% fill factor) in a 3 stage mixing process. The starting temperature for the first stage was 60° C. and was 50° C. for the second and third stages. In the first stage, the Exxon Butyl 268 elastomer was premixed for 30 s at 80 rpm, following which ⅔ of the filler was added. After an additional 60 s, the remaining filler was added, after which the mixture was mixed for an additional 30 s. At this time, the mixer was swept and the oil was added. Mixing continued for an additional 180 s with sweeps every 60 s. In the second stage, the stage 1 masterbatch was mixed at 80 rpm for 240 s. In a third stage, the stage 2 masterbatch was mixed at 60 rpm for 30 s, following which the zinc oxide and resin was added. Mixing continued for an additional 120 seconds, with a sweep at 60 s. Samples were roll milled after each stage, with six end rolls performed before removing material from the mill. The resulting samples were cured at 170° C. for T90+10%. This is the amount of time to achieve 90% cure plus 10% of that time. The degree of cure was measured using a conventional rubber rheometer. The composite elastomers were formed into elastomeric rubber sheets having an approximate thickness of 2 mm. Thermal conductivity of each of the rubber samples was determined according to ASTM D5470 on circular punched samples having a contact area of 1.327 in². Actual sample thickness was measured, contact pressure was 50 psi and the sample temperature was 50° C. The sample ID in Table 3 corresponds to the thermally treated sample from Table 1 that was incorporated into the composite elastomer. The thermal conductivity results are averages of two or more samples.

TABLE 3

| Sample ID | phr Vulcan 3 carbon black | phr Experimental | Sample Thick. (in.) | App. Thermal Cond. (W/mK) |
|---|---|---|---|---|
| 1 | 20 | 30 | 0.045 | 0.259 |
| 4 | 50 | 0 | 0.0437 | 0.247 |
| 5 | 20 | 30 | 0.0459 | 0.271 |
| 6 | 20 | 30 | 0.0382 | 0.31 |
| 7 | 20 | 30 | 0.0369 | 0.277 |
| 8 | 20 | 30 | 0.0414 | 0.285 |

Table 4 presents mechanical data indicating the tensile strength of elastomers containing both experimental and control carbon blacks. Each of the elastomer samples was made as described above. The elastomer labeled "4" included 50 phr of carbon black sample 4 (VULCAN 3 N330 type carbon black) while each of the other samples contained a mixture of 20 phr VULCAN 3 carbon black and 30 phr of the carbon black from Table 1 of the same ID number. For instance, the column labeled "6" includes 20 phr VULCAN 3 carbon black and 30 phr of VULCAN XC72 carbon black that was partially crystallized by thermally treating at 1200° C. (See Table 1). Tensile properties were measured according to ASTM D412. Elongation at break multiplied by tensile strength provides a good value for a comparison of mechanical strength among the samples. The tear test was performed according to ASTM D624 using Die B. It is notable that all of the experimental blends using partially crystallized carbon blacks exhibited higher tensile strength and significantly higher percent elongation break than did the standard Denka Black acetylene black sample (3B) shown in Table 6 One of skill in the art would have expected these improved mechanical properties to be accompanied by a corresponding reduction in heat transfer ability. However, looking at Table 3, the experimental samples exhibited similar or superior heat transfer properties compared to the elastomer sample incorporating acetylene black. In fact, sample 6 provided superior results compared to the acetylene black for both the heat transfer and the mechanical properties. These data indicate that certain partially crystallized carbon blacks can be substituted for the acetylene black (e.g., Denka Black) and provide an elastomer that exhibits as good or better heat transfer as well as improved mechanical properties. Improved mechanical properties should lead to better reliability and a greater number of cycles before failure.

Example 3

Five additional elastomer composite samples were produced. Three of the composite elastomer samples of Example 3 used the same formulation as those in Example 2, reported above. Two additional formulations not used in Example 2 were also evaluated. Samples were prepared using the same techniques as described above for Example 2. The thermal and mechanical properties were tested and are reported below. The samples are designated 3B, 4B, 7B, 9B and 9C, and the digits in each sample ID correspond to the carbon black of the same digit in the first experiment, reported above. Sample "3B" refers to a butyl rubber sample including 20 phr VULCAN 3 carbon black and 30 phr of Denka Black carbon black (Denka). Sample 4B contains VULCAN 3 N330 type reinforcing carbon black (untreated), sample 7B incorporates the same carbon black as in sample 7 (VULCAN XC500 carbon black treated at 1200° C.) and samples 9B and 9C both include VULCAN 3 N330 type carbon black partially crystallized at 1200° C. The results for Example 3 are provided in Tables 5 and 6, below. It is notable that both of the experimental blends using partially crystallized carbon blacks in combination with non-heat treated carbon black exhibited higher tensile strength and elongation at break×tensile strength than did the standard Denka Black acetylene black sample. One of skill in the art would have expected these improved mechanical properties to be accompanied by a corresponding reduction in heat transfer ability. The results indicate that the best combination of thermal and mechanical properties is obtained with a composite including 30 phr sample 7 (partially crystallized VULCAN XC500 carbon black) and 20 phr VULCAN N330 type carbon black. Sample 7 has a Raman crystallinity of 35 Å and an OAN of 135 cm³/100 g.

TABLE 5

| Sample ID | VULCAN 3 carbon black phr | Experimental Carbon Black phr | App. Thermal Cond. (W/mK) |
|---|---|---|---|
| 3B | 20 | 30 | 0.29 |
| 4B | 50 | 0 | 0.26 |
| 7B | 20 | 30 | 0.29 |
| 9B | 20 | 30 | 0.26 |
| 9C | 0 | 50 | 0.27 |

TABLE 6

| Median Value | 3B | 4B | 7B | 9B | 9C |
|---|---|---|---|---|---|
| 100% Modulus, MPa (25° C.) | 2.4 | 2.40 | 2.0 | 2.65 | 1.40 |

TABLE 4

| Elastomer Sample ID | 1 | 4 | 5 | 6 | 7 | 8 |
|---|---|---|---|---|---|---|
| 100% Modulus, MPa (25° C.) | 2.62 | 2.24 | 1.93 | 1.90 | 1.75 | 1.8 |
| 300% Modulus, MPa (25° C.) | 8.71 | 9.42 | 6.22 | 5.69 | 5.92 | 5.43 |
| M300/M100 (25° C.) | 3.32 | 4.20 | 3.22 | 2.99 | 3.38 | 3.02 |
| Tensile Strength, MPa (25° C.) | 15.18 | 17.2 | 14.90 | 14.4 | 14.9 | 14.3 |
| Elongation at Break, % (25° C.) | 568 | 548 | 655 | 661 | 656 | 683 |
| Elongation X | | | | | | |
| Tensile/100 (25° C.) | | 96 | 98 | 95 | 97 | 97.7 |
| Tear Test (25° C.) | 52.1 | 48.0 | 48.3 | 51.3 | 47.1 | 51.3 |
| Tear Test (100° C.) | 32.3 | 30.3 | 27.7 | 28.3 | 21.8 | 21.4 |

TABLE 6-continued

| Median Value | 3B | 4B | 7B | 9B | 9C |
|---|---|---|---|---|---|
| 300% Modulus, MPa(25° C.) | 8.12 | 10.54 | 7.01 | 10.01 | 3.6 |
| M300/M100(25° C.) | 3.38 | 4.39 | 3.5 | 3.78 | 2.57 |
| Tensile Strength, MPa(25° C.) | 13.9 | 18 | 15.5 | 16.2 | 12.7 |
| Elongation at Break, %(25° C.) | 536 | 536 | 623 | 497 | 734 |
| Elongation X Tensile/100(25° C.) | 75 | 96 | 97 | 81 | 93 |
| Tear Test(25° C.) | 43.4 | 48.9 | 45.6 | 45.6 | 50.9 |
| 100% Modulus, MPa (100° C.) | 1.74 | 1.75 | 1.19 | | |
| 300% Modulus, MPa(100° C.) | 5.35 | 7.34 | 3.82 | | |
| Tensile Strength, MPa(100° C.) | 7.34 | 10.98 | 7.86 | | |
| Elongation at Break, %(100° C.) | 457 | 509 | 600 | | |
| Elongation X Tensile/100(100° C.) | 33.54 | 55.89 | 47.2 | | |
| Tear Test (100° C.) | 21.31 | 33.95 | 23.4 | 31.3 | 43.3 |
| M300/M100(100° C.) | 3.07 | 4.19 | 3.21 | | |

Example 4

To evaluate the effectiveness of partially crystallized carbon blacks in multiple elastomeric systems, partially crystallized carbon black and base carbon black were formulated into elastomeric composites comprising styrene/butadiene (SBR) as the elastomeric component. These elastomeric composites were then evaluated for thermal and mechanical properties.

The SBR composites were compounded in three stages in a 300 cm$^3$ Brabender mixer with a fill factor of 0.65 to 100 parts Kralex® SBR 1500 (Synthos Chemicals) and carbon blacks 2, 3 and 7 as listed in Table 2 were added at 55 phr to each sample. Each composite also included 3.0 phr zinc oxide, 1.0 phr stearic acid, 1.0 phr TBBS (N-Tert-Butyl-2-Benzothiazole Sulfenamide) and 1.75 phr sulfur. The polymer was mixed for about two minutes at 50 rpm with a starting temperature of 80° C., following which the carbon black was added and the materials mixed for an additional 30 minutes. In a second stage, the stage 1 masterbatch was mixed for one minute at 60 rpm with a starting temperature of 60° C., after which the zinc oxide and stearic acid were added. This combination was mixed for an additional four minutes, with the mixer swept after the first two minutes. In a third stage, the stage 2 masterbatch was mixed for 30 s at 50 rpm starting at 60° C., following which the curatives, TBBS and sulfur, were added and the material mixed for an additional sixty seconds, with the mixer swept halfway through that time. After each stage, the material was banded on a roll mill for one minute with four end rolls. The composite samples were cured and analyzed for mechanical properties in the same manner as were the butyl rubber samples in Table 4. The mechanical properties of the elastomers are provided in Table 7. These results indicate that partial crystallization of the base carbon black provides for an SBR composite elastomer that provides better modulus, tensile strength and elongation when compared to the base carbon black, in this case VULCAN XC500 carbon black. Heat treatment of the VULCAN XC 500 carbon black, which is not a traditional reinforcing grade, also improved the product of elongation at break×tensile strength of the resulting composite with respect to the Denka black. These results confirm the improvement seen in the butyl rubber composites with the same carbon black samples in a different elastomeric system.

TABLE 7

| Sample ID | 7C | 2C | 3C |
|---|---|---|---|
| Carbon Black (phr) | 55 | 55 | 55 |
| 100% Modulus, MPa (25° C.) | 2.73 | 5.665 | 4.54 |
| 300% Modulus, MPa(25° C.) | 9.9 | 20.4 | 16.6 |
| M300/M100(25° C.) | 3.64 | 3.60 | 3.65 |
| Tensile Strength, MPa(25° C.) | 20.5 | 24.9 | 20.9 |
| Elongation at Break, %(25° C.) | 542 | 371 | 400 |
| Elongation X Tensile/100(25° C.) | 111 | 92 | 84 |

To provide a single value that can be used to compare elastomers in applications requiring both good thermal conductivity and good mechanical properties, representative properties of thermal conductivity and mechanical strength are multiplied together to provide a unitless "Thermal Mechanical Product." Thermal conductivity in W/mK (see Table 3) provides the thermal conductivity contribution to the equation. As stated above, elongation multiplied by tensile strength (see Table 4) provides a single value representative of mechanical properties in elastomers, and this same value is used to contribute the mechanical portion of the equation.

Thermal Mechanical Product=(Thermal Conductivity in W/mK)×(Tensile Strength in MPa)×(% Elongation at Break)

The Thermal Mechanical Product values for experimental and control elastomer composites from Example 2 are provided in Table 8, and results from Example 3 are provided in Table 9. Samples 4 and 4B include only one carbon black, 50 phr VULCAN 3 carbon black; sample 9C includes only one carbon black, 50 phr VULCAN 3 carbon black heat treated at 1200° C. All other samples are 20/30 phr mixtures of VULCAN 3 carbon black and a second carbon black as specified in Tables 1, 2, 3 and 5. Sample 3B is the state of the art elastomer composite used in tire bladders containing 20 phr ASTM N330 type carbon black and 30 phr acetylene black. As shown in Table 8, experimental samples 4-8 all exhibit a substantially higher Thermal Mechanical Product than does the state of the art elastomer, sample 3. Similarly, results from the samples of Example 3 shown in Table 9 indicate that several of the samples incorporating partially crystallized carbon blacks provide a better Thermal Mechanical Product than does the state of the art sample 3B. The experimental elastomers comprising partially crystallized carbon blacks having a morphology according to certain embodiments in place of acetylene black provide improved thermal conductivity, better mechanical properties, or both. Samples 9B (Table 8) and 9C exhibit a low OAN and relatively low crystallinity, and it is believed that this explains the poor Thermal Mechanical Product of this heat treated carbon black when compared to the other partially crystallized carbon blacks. These data demonstrate that the base carbon black is important in producing an effective partially crystallized carbon black, and that one of skill in the art cannot simply take any base carbon black, thermally treat it, and expect it to obtain a level of crystallinity and structure required to improve thermal and mechanical performance in an elastomeric composite.

TABLE 8

| Sample ID | 4 | 5 | 6 | 7 | 8 |
|---|---|---|---|---|---|
| Thermal Mechanical Product | 24.1 | 26.4 | 29.5 | 28.0 | 27.8 |

TABLE 9

| Sample ID | 3B | 4B | 7B | 9B | 9C |
|---|---|---|---|---|---|
| Thermal Mechanical Product | 21.6 | 25.1 | 28.0 | 21.1 | 25.1 |

Figure 2:
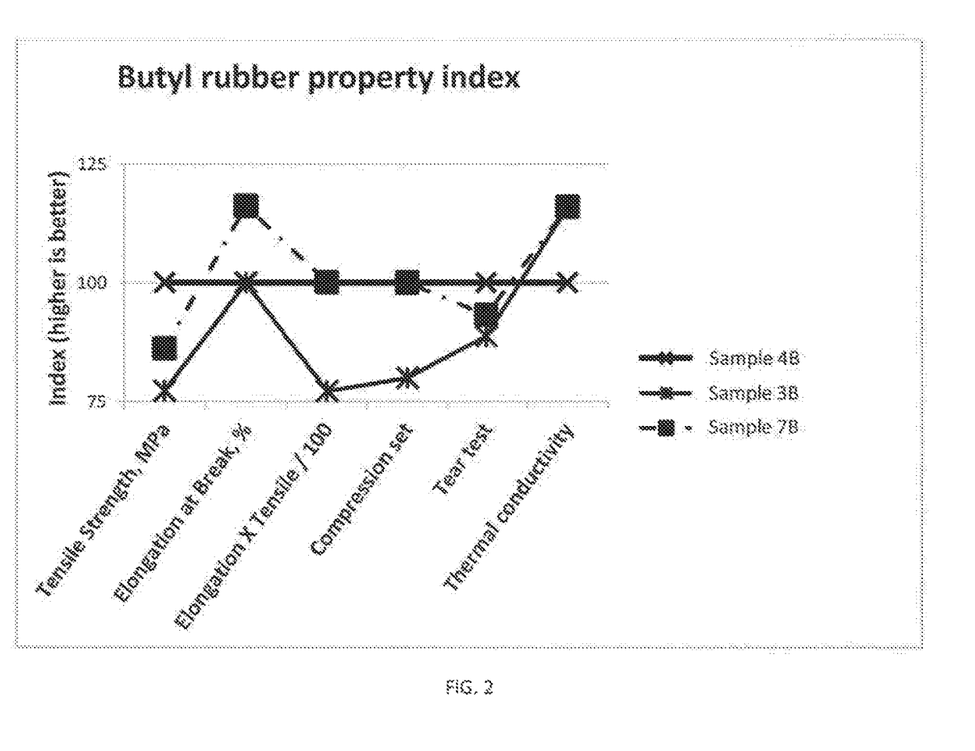
FIG. 2 provides a graph illustrating the relative butyl rubber property index of two blended embodiments and one single carbon black embodiment.

FIG. 2 provides a graph that compares six different properties in three different elastomers (butyl rubber) comprising carbon black. Values for elastomers 3B, 4B and 7B are compared. Elastomer 3B contains a conventional mixture of 20 phr ASTM N330 type carbon black and 30 phr Denka Black (acetylene black). Elastomer 4B contains 50 phr of ASTM N330 type carbon black, and all of the values have been normalized to this composite so that elastomer 4B scores 100 for each of the measured properties. Elastomer 7B includes 20 phr ASTM N330 type carbon black and 30 phr of a partially crystallized carbon black that has a BET surface area of 55 $m^2/g$, an OAN structure of 130 $cm^3/100$ g, a Raman microcrystalline planar size ($L_a$) of 35 angstroms, 45% crystallinity and a surface energy of less than 1 $mJ/m^2$. The graph shows that the experimental composite 7B and conventional composite 3B provide equivalent thermal conductivity values while partially crystallized composite 7B outperforms conventional composite 3B for all of the mechanical indices. These results indicate that substituting partially crystallized carbon blacks for acetylene black in elastomeric composites will provide a durable composite that lasts longer without sacrificing thermal transfer efficiency.

Figure 3:
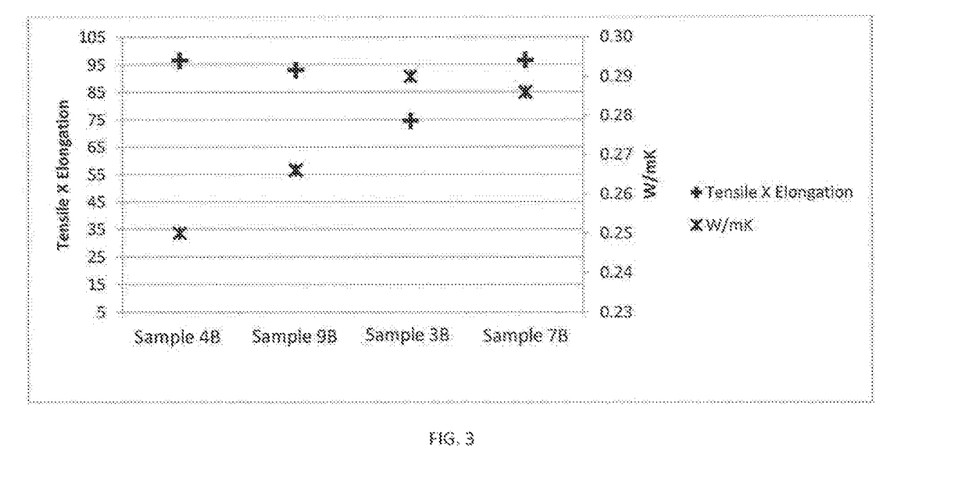
FIG. 3 provides a graph illustrating the tensile strength and thermal transfer efficiency of butyl elastomer with four different embodiments of carbon black combinations.

FIG. 3 provides a graphical comparison of the tensile strength and thermal transfer efficiency of four different elastomer composites including composites 3B, 4B, 7B and 9B. Elastomer composite 9B includes 20 phr ASTM N330 type carbon black and 30 phr of thermally treated (1200° C.) ASTM N330 type carbon black. It is notable that partial crystallization of ASTM N330 through heat treatment provides an elastomer exhibiting reduced tensile strength and identical thermal transfer when compared to an elastomer made with an equivalent concentration of only untreated ASTM N330 type carbon black. This indicates that the superior results achieved by elastomer 7B, and other partially crystallized carbon blacks like it, cannot be obtained simply by thermally treating carbon blacks that are known by those skilled in the art or that are currently used in tire bladders. For example, carbon black 7 has a lower surface area, higher structure, greater planar size, higher percent crystallinity and lower surface energy than does identically treated sample 9B (ASTM N330 type carbon black). As a result, carbon black 7 achieves better mechanical and thermal properties in elastomeric composites than does carbon black 9 (thermally processed ASTM N330 type carbon black).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A compounded elastomeric composition comprising:
   an elastomeric resin;
   a first carbon black;
   a second carbon black different from the first carbon black, wherein the second carbon black is a partially crystallized carbon black having an OAN structure of greater than 120 $cm^3/100$ g and less than 200 $cm^3/100$ g, a surface energy of less than 10 $mJ/m^2$ and a Raman microcrystalline planar size ($L_a$) of greater than or equal to 25 Å and less than or equal to 50 Å.

2. The compounded elastomeric composition of claim 1 wherein the weight ratio of the first carbon black to the second carbon black is less than 2:1 and greater than 1:2.

3. The compounded elastomeric composition of claim 1 wherein the elastomeric resin is selected from the group consisting of butyl rubber, halobutyl rubber, nitrile, hydrogenated nitrile butadiene rubber (HNBR), ETDM, polychloroprene rubber, acrylonitrile butadiene rubber, hydrogenated nitrile rubber, fluoroelastomers, polyacrylate elastomers, ethylene propylene diene monomer (EPDM), ethylene vinyl acetate elastomers (EVA), polysulfide elastomers, natural rubber, styrene butadiene rubber, and mixtures thereof.

4. The compounded elastomeric composition of claim 1 wherein the thermal conductivity of the compounded elastomeric composition is greater than 0.29 W/mK.

5. The compounded elastomeric composition of claim 1 wherein, when cured, the cured compounded elastomeric composition exhibits a tensile strength, measured at 25° C., of greater than 14.00 MPa and elongation at break, measured at 25° C., of greater than 550% and/or an ((elongation at break)×(tensile strength))/100% of greater than 80.

6. The compounded elastomeric composition of claim 1 wherein the second carbon black is a carbon black that has been thermally treated at a temperature between 1100° C. and 1800° C.

7. The compounded elastomeric composition of claim 1 wherein the second carbon black has a percent crystallinity of greater than 40% and less than 60%.

8. The compounded elastomeric composition of claim 1 wherein the elastomeric resin is a butyl elastomer or a halobutyl elastomer.

9. The compounded elastomeric composition of claim 1 wherein the first carbon black is a furnace black that meets the requirements of an ASTM N330 type carbon black.

10. A tire bladder fabricated from the compounded elastomer of claim 1.

11. An elastomeric article comprising the compounded elastomeric composition of claim 1, wherein the elastomeric article is a hose, a belt, a cable, a seal, an o-ring, a grommet, a gasket, a bellows, a diaphragm, a valve, a duct, a bushing, a rail buffer, a tire component, a tire inner-tube, a vibration damping component, an engine mount, a chassis mount, a joint boot, a wire harness, or other molded or extruded rubber article.

12. A compounded butyl elastomer composition comprising a butyl elastomer, a first carbon black, and a second carbon black different from the first carbon black, wherein the second carbon black is a partially crystallized carbon black having a Raman microcrystalline planar size ($L_a$) of greater than or equal to 22 Å, wherein the compounded butyl elastomer composition exhibits a thermal conductivity of greater than 0.25 W/mK and an ((elongation at break)×(tensile strength))/100% of greater than 80, wherein elongation at break and tensile strength are measured at 25° C.

13. The compounded butyl elastomer composition of claim 12 wherein the compounded butyl elastomer composition, when cured, exhibits a thermal conductivity of greater than 0.30 W/mK.

14. The compounded butyl elastomer composition of claim 12 wherein the first carbon black is a furnace black.

15. The compounded butyl elastomer composition of claim 12 wherein the concentration of the partially crystallized carbon black is at least 25 phr.

16. The compounded butyl elastomer composition of claim 14, wherein the concentration of the furnace black is at least 15 phr.

17. The compounded butyl elastomer composition of claim 14, wherein the concentration of the partially crystallized carbon black is greater than the concentration of the furnace black.

18. A tire bladder comprising the compounded butyl elastomer composition of claim 12.

19. A compounded butyl elastomer composition comprising:
a butyl elastomer and at least 40 phr carbon black having a Raman microcrystalline planar size ($L_a$) of greater than or equal to 22 Å and less than 45 Å, an OAN structure of greater than 120 and less than 200 cm$^3$/100 g, and a surface energy of less than 10 mJ/m$^2$, and wherein the compounded butyl elastomer composition has a thermal conductivity of greater than 0.29 W/mK and a tensile strength at 25° C. of greater than 14.0.

20. A compounded elastomeric composition comprising:
an elastomeric resin; and
a carbon black exhibiting a surface energy of less than 10 mJ/m,$^2$ a Raman microcrystalline planar size ($L_a$) of between 23 Å and 45 Å and an OAN of greater than 85 cm$^3$/100 g and less than 200 cm$^3$/100 g.

21. The compounded elastomeric composition of claim 20, wherein the OAN of the carbon black is greater than 130 cm$^3$/100 g.

22. The compounded elastomeric composition of claim 20, wherein the Raman microcrystalline planar size of the carbon black is greater than 30 Å.

23. The compounded elastomeric composition of claim 20, wherein the surface energy of the carbon black is less than 7 mJ/m$^2$.

24. A compounded butyl elastomer composition comprising a butyl elastomer and at least 40 phr carbon black, wherein a portion of the carbon black is produced by thermal treatment of a base furnace black at a temperature of less than 1800° C. for a period of time adequate to increase the Raman microcrystalline planar size ($L_a$) of the base furnace black by greater than 5 Å, wherein the (thermal conductivity in W/mK)×(elongation at break %)×(tensile strength in MPa) of the compounded butyl elastomer composition is greater than 2200, wherein elongation at break and tensile strength are measured at 25° C.

25. A compounded butyl elastomer composition of claim 24 wherein the Raman microcrystalline planar size ($L_a$) of the base furnace black is increased by less than 50 Å.

* * * * *